US012591492B2

(12) United States Patent  
Diziol et al.

(10) Patent No.: US 12,591,492 B2  
(45) Date of Patent: Mar. 31, 2026

(54) DATA PROCESSING NETWORK FOR DATA PROCESSING

(71) Applicant: Robert Bosch GmbH, Stuttgart (DE)

(72) Inventors: Raphael Diziol, Kandel (DE); Michael Poehnl, Wurmberg (DE); Stefan Egenter, Freiburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 42 days.

(21) Appl. No.: 18/701,355

(22) PCT Filed: Sep. 28, 2022

(86) PCT No.: PCT/EP2022/076891  
§ 371 (c)(1),  
(2) Date: May 20, 2024

(87) PCT Pub. No.: WO2023/066624  
PCT Pub. Date: Apr. 27, 2023

(65) Prior Publication Data  
US 2025/0004890 A1     Jan. 2, 2025

(30) Foreign Application Priority Data  
Oct. 18, 2021    (DE) ..................... 10 2021 211 709.0

(51) Int. Cl.  
*G06F 11/16*          (2006.01)  
*G06F 11/362*         (2025.01)

(52) U.S. Cl.  
CPC ........ *G06F 11/1608* (2013.01); *G06F 11/362* (2013.01)

(58) Field of Classification Search  
CPC .............. G06F 11/1608; G06F 11/362; G06F 11/0739; G06F 11/0772; G06F 11/0778;  
(Continued)

(56) References Cited

U.S. PATENT DOCUMENTS 6,591,378 B1 *  7/2003  Arends ................... G06F 9/321  
                                                       717/124  
2004/0148548 A1 *  7/2004  Moyer ................ G06F 11/3698  
                                                       714/25  
(Continued)

FOREIGN PATENT DOCUMENTS

JP       2009506408 A     2/2009  
JP       2013501377 A     1/2013  
(Continued)

OTHER PUBLICATIONS

International Search Report in connection with PCT/EP2022/076891 dated Feb. 10, 2023.  
(Continued)

*Primary Examiner* — James C Kerveros  
(74) *Attorney, Agent, or Firm* — NORTON ROSE FULBRIGHT US LLP

(57)     ABSTRACT

A data processing network for performing successive data processing steps in a redundant and validated manner. Each step is used to generate output data from input data. Output data from a first data processing step are at least partially simultaneously input data of a further data processing step. At least one first data processing module is provided for performing each data processing step. The data processing network also includes a comparator module. The first data processing modules transmit control parameters of the individual data processing steps to the comparator module. The comparator module is provides a synchronized control parameter which contains control information relating to at least one performed data processing step. The data processing network includes a recording module in which a debug mode can be activated with which debug data containing information on each execution of a data processing step with the data processing network are recorded.

13 Claims, 4 Drawing Sheets

(58) Field of Classification Search
CPC . G06F 11/263; G06F 11/3698; G06F 11/1641
USPC ......................................................... 714/819
See application file for complete search history.

(56)                         References Cited

U.S. PATENT DOCUMENTS

| | | | | |
|---|---|---|---|---|
| 2004/0230867 A1* | 11/2004 | Soheili | ................ | G06F 11/3698 |
| | | | | 714/25 |
| 2013/0097462 A1* | 4/2013 | Singh | ...................... | G06F 11/25 |
| | | | | 714/39 |
| 2016/0034368 A1 | 2/2016 | Nishii et al. | | |
| 2016/0062862 A1* | 3/2016 | Moyer | ................ | G06F 11/1048 |
| | | | | 714/33 |
| 2018/0203778 A1* | 7/2018 | Bansal | ................ | G06F 11/1645 |
| 2019/0303260 A1* | 10/2019 | Ozer | ................... | G06F 11/1641 |
| 2020/0073806 A1 | 3/2020 | Hayakawa et al. | | |

FOREIGN PATENT DOCUMENTS

| | | | |
|---|---|---|---|
| JP | 2020004108 A | 1/2020 |
| WO | 2017064623 A1 | 4/2017 |

OTHER PUBLICATIONS

Hernandez, et al. "Low-cost Checkpointing in Automotive Safety-Relevant Systems," Barcelona Supercomputing Center (BSC-CNS), 2015 Design, Automation & Test in Europe Conference and Exhibition, pp. 1-6.

\* cited by examiner comparator module synchronizer recording module

23

7

27

29

31

2

30 sensor 19    3 data processing modules    5    6 date processing modules    5    6

3 output data receiver

20

4

2

1 sensor 19    3 date processing modules    5    6

4

2 recording module

1

29

30 a)    2.1    2.2    2.3    5,12    t 8    9  8    9,25    24 c)    7,14    t 8    9  8    9    6,13    t b)    2.1    2.2    2.3

16    21    16    21    16    17

32    2.1    2.2    2.3    t

DATA PROCESSING NETWORK FOR DATA PROCESSING

BACKGROUND INFORMATION

Driver assistance or automated driving systems consist of many individual software units, which, with respect to data flow, can generally be described with graphs. These software units (often also called runnables, nodes, or data processing components) are characterized by an amount of input data being processed and an amount of output data being generated therefrom.

In the aforementioned systems, input data from sensors, such as radar or video, are processed in a graph of data processing components that visualizes the data flow in a static view.

The various software units generally form a complex data processing network with which sensor data are processed in order to perform actions on the basis of the sensor data. Such actions can, for example, be control tasks as part of autonomous driving of a vehicle. The data processing in the data processing network usually includes a multiplicity of data processing steps or data processing tasks that build on one another and are executed with the data processing components.

As part of the requirements for the functional safety of driver assistance systems and (highly) automated driving (HAD), the probability of systematic and sporadic hardware errors must not exceed a specified frequency in relation to the risk and the expected damage to the system functions. Because newly developed driver assistance systems are generally used in parallel with one another in a large number of vehicles and the risk must be assessed with respect to the entire fleet of vehicles equipped accordingly, the acceptable probability of hardware errors occurring is extremely low.

In comparison to today's high-end processors, the computing power of commonly available microcontrollers that fulfill these safety levels is very limited. Their maximum clock rate is about 10% (300 MHz vs. 3 GHz) and they lack internal optimizers, which are standard in off-the-shelf microprocessors ($\mu$P) and play a major role in their performance.

A major problem in this context is the detection of errors in the program code (debugging) due to the extremely large amounts of data that are processed in such applications, and there is sometimes considerable effort to reproduce a particular undesired behavior of such software for development purposes. For tests, such software runs for example in vehicles that are performing a test run. In doing so, very large amounts of data are acquired for example by camera sensors and processed in a data processing network. With conventional approaches, these data are no longer available in identical form for the subsequent re-performance of the test for reproducing the respective defective behaviors.

Proceeding therefrom, a novel approach to building a data processing network for a motor vehicle is to be described, which proposes a solution to the limited computing powers of commonly available microcontrollers for such safety levels.

SUMMARY

Described here is a data processing network according to an example embodiment of the present invention for performing a multiplicity of successive data processing steps in a redundant and validated manner, which steps are each used to generate output data from input data, wherein output data from a first data processing step are at least partially simultaneously input data of a further data processing step, wherein at least one first data processing module is provided for performing each data processing step, wherein the data processing network also comprises a comparator module, wherein the first data processing modules are configured to transmit control parameters of the individual data processing steps to the comparator module and the comparator module is configured to provide a synchronized control parameter which contains control information relating to at least one performed data processing step, wherein the data processing network comprises a recording module in which a debug mode can be activated with which debug data containing information on each execution of a data processing step with the data processing network are recorded.

According to an example embodiment of the present invention, it is particularly preferred if the data processing network comprises, for at least one first data processing module, a second data processing module which is configured to execute the same data processing step as the associated first data processing module and to transmit a control parameter to the comparator module, wherein the synchronized control parameter is generated by at least one comparison of corresponding control parameters transmitted by the first data processing modules and the second data processing modules.

The special feature of the data processing network described here is the recording module which permanently records debug data containing information on each execution of a data processing step. These debug data can later be used to replay the respective data processing steps in the data processing network and/or in a test environment.

In the described data processing network according to an example embodiment of the present invention with first data processing modules and second data processing modules, it is possible to realize a software lockstep on the basis of hardware that does not inherently fulfill the corresponding requirements (e.g., ASIL-D conformity). This is successful in particular for data processing networks whose data processing requires high computing powers, which usually requires hardware with very high performance capability.

The basic approach according to an example embodiment of the present invention is to use separate hardware (separate cores) for the first data processing module and the second data processing module, which hardware/cores have high computing power and both perform the same calculation. The comparator module compares the calculations, and only in the case of equality of the calculation result is the calculation result used for further data processing in the data processing network. The equality is monitored by the data processing module on the basis of the control parameters, and the synchronized control parameter is used in the data processing network to control the control flow of the data processing.

The points at which the first data processing module and the second data processing module provide the control parameters in order to forward them to the comparator module are also generally referred to as synchronization points.

As already mentioned, the method described here relates to a so-called software lockstep. A software lockstep must be distinguished from a hardware lockstep. A hardware lockstep requires considerably more complex hardware.

The hardware lockstep, which is not provided here, is generally implemented such that hardware is used which executes each calculation step of the software programs operated thereon twice. This means that the software program itself only runs once on the hardware. An operating system sees only one instance of the particular software program. The hardware executes each step of the software twice below the one operating system level.

In contrast, the software lockstep described here means that the program is executed twice, namely twice at the operating system level. Where appropriate, two independent operating systems may also be operated (a first operating system on the first data processing module with a first hardware/core and a second operating system on the second data processing module with a second hardware/core), which execute the respective data processing steps in each case (and thus twice).

A software lockstep can also be operated on an operating system, in which case the instruction to use different hardware (two different cores) for the double execution may then be given at the operating system level.

As soon as there are two instances that can be replicated/reproduced without changing the hardware, the double execution is a so-called software lockstep. A hardware lockstep always means that an additional redundant execution must also require additional hardware (circuits, transistors, etc.), which are located below the operating system level and which the operating system cannot see as separate from one another, but which appear like one piece of hardware to the operating system. The use of a hardware lockstep thus always requires at least twice the number of transistors in order to achieve the same performance as without a hardware lockstep.

Through the described data processing network or with the described data processing network, a lockstep approach is also possible on controllers/processors that have not been specifically developed for this purpose.

The normal case is, however, that the first data processing module and the second data processing module are implemented with identical software and that hardware that is identical (identical cores) in terms of specification is also used. As long as each data processing module or the underlying hardware functions correctly, the same input data also produce the same output data in both data processing modules.

If a software lockstep is used for real-time (near real-time) applications, many conventional architectures are based on time slice grids in which the processing of the computing steps must not exceed the specified scope under any circumstances. In this context, the so-called WCET (WCET=worst case execution time) is often mentioned. Which computing steps are executed in which order in the time slices is defined a priori. Since the computing steps are known in advance, the two units used can execute the computing steps in parallel. There is often a high degree of variability in how much computational effort is required to process the input data to generate output data. One example is the case of an image analysis for ascertaining all visible traffic signs. For example, a data processing step for performing such an analysis takes much longer if a hundred traffic signs are visible at the same time than if only two traffic signs are in the field of view. In a common software lockstep approach, time slices would have to be designed on the basis of a WCET such that sufficient time is provided to perform the data processing step for all conceivable relevant cases.

In comparison, data-driven systems are more flexible, although the order of execution can depend on the result and the duration of the preceding calculations. In this case, the order of the computing steps is no longer known a priori. For a SW lockstep, this property means that possible branch points must always also be synchronization points. If the computing units are used in parallel, the result of one computing step must always be validated before the next step can be known for certain and executed.

It can therefore be more efficient for data-driven architectures not to calculate in parallel but to let one computing unit run (first, without synchronization) and to calculate and verify the achieved result on the other units afterwards, with the identical order of execution specified. In this case, there is therefore a primary module that specifies the calculation on the subordinate secondary modules.

Today's hardware-lockstep-capable microcontrollers do not fulfill the requirements for the computing power needed for highly automated driving; at the same time, current high-performance processors do not fulfill the required ASIL-D safety classifications.

In order nevertheless to obtain a computing system for highly automated driving, a way must be found to secure the fast but non-secure processors in an appropriate manner. For this purpose, the recommendation here is to use a software lockstep.

The simplest way to attempt this would be to realize the software lockstep on an appropriate microprocessor. However, this would not only (at least) halve the computing power thereof but would also have two serious problems: On the one hand, systematic errors could not be ruled out with redundant computing on the identical hardware and, on the other hand, a necessary comparator for comparing the output data/calculation results would also run on the non-secure hardware, which is why the results could not be sufficiently trusted.

In order to solve this problem, according to an example embodiment of the present invention, it is provided here to implement a software lockstep on the basis of at least two modules with separate hardware and a comparator unit (comparator module), wherein the comparator unit/the comparator module runs on additional ASIL-D-compliant hardware.

Since the maximum required computing time must be provided in the above-described approaches, taking into account a WCET, but is typically only needed in exceptional cases, time is "left over" in most steps, which adds up to give an unacceptable latency over the processing chain of the system and leads to poorer utilization of the hardware. The danger with a parallel software lockstep with an a priori defined order of execution and the use of WCET is therefore that the required maximum latency in the overall system cannot be achieved or may be undercut.

A significantly better use could be achieved with a data-driven architecture, as described above, for example with a primary module and post-calculating secondary modules. In such an architecture, the next data processing step is in each case executed ad hoc, wherein the exact process does not have to be known a priori, resulting in high flexibility.

However, in particular for the automotive applications described here, such an architecture has disadvantages, which are briefly to be explained below:

The order of execution is specified by the primary module. The dependent secondary modules post-calculate "blindly" so to speak. Therefore, the order of the execution can only, if at all, be checked on the basis of invariants or general rules. This results in the same safety classification for the control flow as individually for the particular hardware used. A high ASIL-D level cannot be achieved with such architectures. In other words, by post-calculating with the secondary modules, it can subsequently be determined that the calculations in the primary module may have been incorrect, but then it is already too late because the results of the calculations were already needed previously.

The calculations can only ever be compared after the redundant computing step has been completed and the results have subsequently been communicated. The time until an error in the calculation is detected has doubled due to the principle. This results in increased error latency and possibly also unnecessary latency in the regular process.

That is to say, although conventional lockstep approaches with a primary module and secondary module(s) allow more flexible and data-driven execution, they also have the problem of increased latency.

The data processing network presented and the data processing methods implemented therewith allow sufficient performance for highly autonomous driving. The presented data processing network makes a combined time- and data-driven architecture possible. That is to say, in comparison to approaches with an a priori defined order of execution, a flexible order of execution is possible in the software lockstep.

For this purpose, a software lockstep approach that is performed in parallel but is not based on time slices is selected, which approach is realized on at least two microprocessors (the first data processing module and the second data processing module) as computing units and a control component that runs on additional, trustworthy hardware (the comparator module). This control unit, which complies with the target safety standard, synchronizes the process on the computing units and compares their results.

In comparison to the primary/secondary module lockstep, the redundant calculation steps are processed (quasi) simultaneously, thus resulting in no cascade and therefore better latency behavior (see FIG. 3). Instead of sending the complete data packets to the comparator, it is also possible in the data processing network described here to transmit only the cross sums of the data (packets) as control parameters from the data processing modules to the comparator module, which may significantly reduce the communication effort.

These optimizations and the mixed, i.e., data- and time-driven, operation ensure good and efficient utilization of the hardware.

From the perspective of a safety architecture, the structure of the data processing network described corresponds to the decomposition of a safety-critical task. This results in a reduced ASIL requirement for the individual computing units so that an ASIL-D classification of the overall system can already be achieved with today's high-performance processors.

In order to be able to use the described data processing network for the execution of software, the following requirements must be met:

All data events and all relevant control events are represented on a timeline or an equivalent structure, such as an event queue. The timeline can also be referred to as a "common logical timeline."

Each calculation step that is started as a result of a control event is data-deterministic. That is to say, identical input data always result in the same output data if the initial state is the same.

According to an example embodiment of the present invention, it is particularly advantageous if the comparison of the control parameters comprises an identity check and a synchronized control parameter requires an identity of the control parameters from the first data processing module and the second data processing module.

Furthermore, according to an example embodiment of the present invention, it is advantageous if the data processing network is configured to use synchronized control parameters provided by the comparator module, in order to control further data processing of the output data with further data processing steps of the data processing network.

In addition, according to an example embodiment of the present invention, it is advantageous if the synchronized control parameter is a validity parameter which contains validity information relating to at least one data processing step performed.

Furthermore, according to an example embodiment of the present invention, it is advantageous if the data processing network has at least one sequentialization module which is respectively configured to sort and synchronize control parameters from the data processing modules and/or the data processing steps and then to forward them with sorting to the comparator module so that the comparator module can ascertain synchronized control parameters independently of the order in which the data processing modules have executed the data processing steps.

The sequentialization module is used in particular to track the order in which data processing steps are completed in the individual data processing modules and in particular on the respectively available hardware. In this way, an availability of the hardware for performing further data processing tasks can be determined. The sequentialization module is in each case assigned to the data processing module and transmits the control parameter to the comparator module or the (third) hardware component on which the comparator module is operated.

Additionally, according to an example embodiment of the present invention, there is preferably a synchronizer that synchronizes mutually associated control parameters (which correspond precisely as long as no error has occurred) of the two data processing modules with one another and, where appropriate, forms control parameter tuples that are supplied to the comparator module. The synchronizer and the comparator module together preferably form a central unit that is operated on a (third) hardware component. The synchronizer achieves flexibility in the order of execution of the data processing steps. The hardware of the particular data processing module can also be used (if this hardware has finished performing a data processing step) to perform further data processing steps.

Since the same data processing step is performed on the first data processing module and the second data processing module, the same control events and data events are generated on both if the process is successful, but can be generated in a different order due to the parallel processing on the units.

The central unit (consisting of comparator module and synchronizer) now temporarily stores events (control parameters) until the matching event (the corresponding control parameter) has arrived from all data processing modules. The mutually associated control parameters can then be compared and, in the case of equality, evaluated, or the synchronized control parameter can be output.

Preferably, according to an example embodiment of the present invention, there is also a task distribution module, which, when synchronized control parameters from the hardware module are available, subsequently plans and orders the start of the individual (next) data processing steps on the particular hardware so that particularly good hardware utilization can be achieved.

The task distribution module preferably sends a type of stimulus to the individual data processing modules in order to activate them. The use of the central unit or the third hardware component and the comparator module results in a slight increase in the latency between the performance of two data processing tasks. Overall, however, this increase in latency is acceptable, in particular in comparison to conventional primary/secondary module architectures.

In the event that the central unit or the synchronizer and the sequentialization modules and the comparator module cannot determine a clear order of the control parameters/events received, an error can be determined. Depending on the application, this may result in a new post-calculation or a termination of the data processing with the data processing network.

Stimuli are found by the central unit in a certain way. Whenever a correct calculation result was ascertained by the comparator module by comparing control parameters and a synchronized control parameter could be calculated, a stimulus was found, so to speak, which triggers further data processing that requires, as input data, output data calculated with the respective first data processing module and the respective second data processing module. In order to find any stimuli for the execution of further calculation steps, the central unit evaluates not only all received data events (control parameters) but also events that represent the end of a previous calculation step ('End' or 'DistributeSamples'). In addition, time events can be generated as stimuli for a time-driven execution.

The central unit manages the above-described timeline (common logical timeline) of the data processing, to an extent.

If successful, this results in a data-driven and time-driven process with the identical result on all computing units, despite possible differences in the local orders of execution.

It is particularly preferable if the recording module is connected to the comparator module and is configured to record control parameters that occur in the comparator module.

According to an example embodiment of the present invention, the comparator module and the control parameters occurring in the comparator module (in particular the synchronized control parameters, but possibly also the control parameters transmitted by the data processing modules) form a particularly good reference point for the recording module to record debug data. These control parameters can already be used to generate a basic structure of the debug data to be recorded. The control parameters form a kind of basic data framework for the debug data, into which further data can then be fed for the subsequent execution of the respective data processing steps in a debugging system (replay).

According to an example embodiment of the present invention, in addition to the comparator module, all data processing modules of the data processing network are preferably also connected to the recording module. The comparator module itself does not usually receive the actually processed data, but only information about when which data pass into a module. The data, but only the control parameters. In order to record the actually processed data in the data processing modules, there are preferably also data connections between the data processing modules and the recording module.

Furthermore, according to an example embodiment of the present invention, it is preferred if the recording module is configured to record a state of the at least one first data processing module and/or the at least one second data processing module when the debug mode is activated.

This state includes in particular internal memory states of memory areas assigned to the respective data processing modules. This state may sometimes already include considerable amounts of data that must be stored here. It may take longer to store such states because the data transfer of the data describing the state is so large. In this case, it may happen that the state is still being stored while further data processing steps have already been completed. Preferably, the recording module has technology suitable for this purpose.

The state must usually be recorded by each data processing module. This is usually necessary in order to have the entire state of the data processing network available for debugging.

According to an example embodiment of the present invention, preferably, the (internal) states of the data processing modules are recorded repeatedly at regular intervals. It is sufficient to start the operation of a debugging system if the state is recorded once at the start. Nevertheless, it is helpful (if enough bandwidth is available) to record further states (so-called keyframes) during operation. The debugging system thus does not always have to be started from the beginning of the recording with the recording module but can be started at any keyframe.

In addition, according to an example embodiment of the present invention, it is preferred if the recording module is configured to record initial input data of each data processing step of the data processing network when the debug mode is activated.

Preferably, according to an example embodiment of the present invention, the data processing network comprises a large number of data processing steps, building on one another, for the data processing of sensor data to the (final) output data of the data processing network. In this system, each data processing step or each data processing module has input data. Preferably, the recording module is designed such that, for each individual repeated data processing step, input data are recorded at least once (when the debug module is activated) as initial input data so that these input data can be used to synthesize an initial state of the entire data processing network in a debugging system.

According to an example embodiment of the present invention, it is also preferable if the recording module is configured such that input data of each data processing step are permanently recorded while the debug mode is activated.

Input data of each individual data processing step are recorded permanently in particular if an available bandwidth for recording data permits it. Particularly preferably, there is a dynamic mode which records input data, while the debug mode is active, whenever this is possible in terms of the available bandwidth without impairing the overall system.

According to an example embodiment of the present invention, it is also preferable if priority parameters are assigned to the data processing steps and information on each execution of a data processing step is recorded according to these priority parameters.

In this case, the priority threshold up to which data are recorded in debug mode can be adjusted depending on the available bandwidth for recording data. If a large bandwidth is available, more data are recorded in debug mode than if the available bandwidth is limited and only minimal data are recorded in debug mode, which data are required to synthesize the states of the data processing network in a debugging system.

According to an example embodiment of the present invention, the data processing network is particularly preferred if a slowdown mode can be activated in debug mode, which can be used to ensure that information on each execution of a data processing step is recorded completely.

In the operation of the data processing network, there is usually already a lack of available computing capacity and bandwidth for performing the data processing steps required for data processing. For this reason, the execution of the debug mode with the operation of the recording module and the recording of the debug data is a critical process for which capacities for recording the data may have to be created. This can be achieved by means of the slowdown mode described above. In this mode, the operation of the data processing network is reduced to such an extent that the complete recording of the necessary information in debug mode is possible in any case.

According to an example embodiment of the present invention, particularly preferably, it is ensured in the slowdown mode that all input data at the first level (in particular sensor data) into the system are recorded completely and data generated within the system by modules are only recorded according to priority and available bandwidth, so that the system is only slowed down if the input data at the system boundary (in particular sensor data, as well as data for starting the system such as states and input data of each module at the start of the system) cannot be recorded completely. Input data of the modules that could also be synthesized in the debugging system and states (keyframes) produced during the recording are preferably recorded only if this is possible without slowing down the data processing network below a certain limit.

According to an example embodiment of the present invention, it is advantageous if first data processing modules are realized with first hardware components and second data processing modules are realized with second hardware components, wherein first hardware components and second hardware components are physically separated from one another.

According to an example embodiment of the present invention, it is also advantageous if at least one of the data processing modules has a hardware component that is not ASIL-D-compliant.

According to an example embodiment of the present invention, it is particularly advantageous if both hardware components of the data processing modules are not ASIL-D-compliant.

Furthermore, according to an example embodiment of the present invention, it is advantageous if the comparator module is realized with third hardware components that are physically separated from the first hardware components and the second hardware components.

In this context, it is advantageous if the third hardware component is ASIL-D-compliant.

According to an example embodiment of the present invention, it is also advantageous if the comparator module has a data memory in which ascertained control parameters are stored with time information so that a logical timeline is created, which represents the order of the processing of the data processing steps with the data processing modules of the data processing network, wherein the recording module is configured in debug mode to record this logical timeline with a flowchart of the data processing steps performed.

The basic data framework formed with the control parameters is in particular helpful for recording on this logical timeline. The control parameters preferably also contain time information of the individual executions (start times and end times of the executions of the individual data processing steps with the data processing modules). With the help of this time information, all data processing steps recorded with the recording module, including the respectively processed data, can preferably be represented on a logical timeline.

In this context, according to an example embodiment of the present invention, it is also advantageous if a hardware component of the data processing modules is significantly more powerful than a hardware component of the comparator module. The possible differences in performance between the third hardware component of the comparator module and the (first and second) hardware components of the data processing modules depend on the particular application of the data processing network. It is common, for example, for a processor clock rate of the first and second hardware components to be at least 5 times or even 10 times as high as the processor clock rate of the third hardware component.

In order to reduce the load on the communication path between the data processing modules and the central unit (comparator module and possibly sequentialization module and task distribution module), according to an example embodiment of the present invention, it is possible, for large amounts of data as output data, to calculate control parameters as the cross sum (CRC) thereof and to send only these cross sums together with the unique packet identification (also referred to as meta sample) as control parameters to the comparator module. The actual flow of output data from one data processing step as input data to the next data processing step can take place on the first hardware component and the second hardware component (and possibly also on further hardware components) independently of one another or in parallel with one another, wherein data transmission interfaces which are also independent of the central unit or the comparator module may exist between different hardware components. The central unit or the comparator module then does not check the original data but, for example, the cross sums thereof, which leads to a bit-by-bit comparison of the original content. It should be noted in this respect that the first hardware component and the second hardware component must temporarily buffer the original data packets until they have been confirmed by the comparator and can be delivered.

Since the proposed calculation of the cross sums as control parameters for transfer to the comparator module also represents a non-negligible consumption of resources, it is also possible to decide, depending on the amount of output data, whether a direct comparison of the output data or a comparison of cross sums of the output data takes place.

According to an example embodiment of the present invention, it is particularly advantageous if the comparison of the control parameters comprises a check as to whether an error occurring during the data processing in the first data processing module and/or in the second data processing module is below a tolerance limit and whether the synchronized control parameter is generated in this case. In particular, this means that, in such cases, the synchronized control parameter may be generated even though an error has occurred which is, however, below the tolerance limit.

Also to be described herein according to an example embodiment of the present invention is a method for operating a described data processing network, comprising at least the following steps:

a) performing a data processing step with a first data processing module and generating a first control parameter suitable for checking the performance of the data processing step with the first data processing module;

b) independently of step a), performing the same data processing step with a second data processing module and generating a second control parameter suitable for checking the performance of the data processing step with the second data processing module;

c) performing a comparison of corresponding control parameters transmitted from the first data processing module and the second data processing module, using a comparator module, and, on the basis of this comparison, providing at least one synchronized control parameter containing control information relating to at least one data processing step performed.

Also to be described herein is a debugging system according to the present invention for checking data processing with a described data processing network, comprising debugging data processing modules for performing the data processing steps which are also executed correspondingly in the data processing network, comprising an import module for importing debug data recorded with the recording module of the data processing network, and means for starting the data processing with the debugging system.

The debugging system is a system which makes it possible to track the data processing steps performed in the data processing network described above, wherein the same program code and preferably the same compilations of this program code (where appropriate, only up to a certain level) are preferably used for this purpose. The restriction "up to a certain level" means that, in lower layers close to the hardware, there may be differences between the execution of the data processing steps on the hardware in use and the execution in the debugging system. In this case, it is however preferably ensured (as far as possible) that differences at such levels do not lead to problems in the detection of errors with the aid of the debugging system.

In particular, according to an example embodiment of the present invention, it is preferred if the debugging system likewise has a structure with data processing modules for performing the data processing steps and a comparator module for managing control parameters. Usually not present in the debugging system is a structure with two data processing modules that calculate in parallel to execute the data processing steps in a redundant manner. This is in particular not provided in the debugging system because the focus of the debugging system is the testing or the checking of the executions of the data processing steps in the data processing network. A high level of fail-safety (high ASIL-D level) is generally not required here.

According to an example embodiment of the present invention, the debugging system is particularly advantageous if it is configured such that initial input data and a state of the at least one first data processing module and/or the at least one second data processing module are imported into the debugging data processing modules when the data processing with the debugging system is started.

Preferably, according to an example embodiment of the present invention, with the initial input data into the data processing modules or for the data processing steps as well as data relating to the internal state of the data processing modules, the debugging system can, at the start time, be put into a situation in which it works from then on in exactly the same way as the data processing network has worked. For this subsequent work after the start time, only initial input data into the data processing network, which have been recorded, are then generally required. These are, for example, sensor data from sensors of the vehicle that are permanently recorded while the vehicle is being driven. During the data processing with the debugging system, new input data are then continuously produced for downstream data processing modules. This is done by producing output data from data processing modules or data processing steps in the debugging system. Such output data generally forms input data for subsequent data processing modules. Such input data generated with the debugging system are referred to as synthetic input data.

In addition, according to an example embodiment of the present invention, it is preferred if the debugging system is configured such that, during the data processing with the debugging system, a debug comparison takes place between synthetic input data generated by the data processing with the debugging system and input data permanently recorded by the recording module in debug mode.

In this way, the search for errors in the data processing can be further improved.

The described data processing network, the debugging system and the technical environment of the present invention are explained below with reference to the figures. The figures show preferred exemplary embodiments of the present invention, which are not limited to the disclosure. The figures are only schematic and respectively illustrate individual aspects of the described data processing network of the present invention.

DETAILED DESCRIPTION OF EXAMPLE EMBODIMENTS

Figures 1, 2:
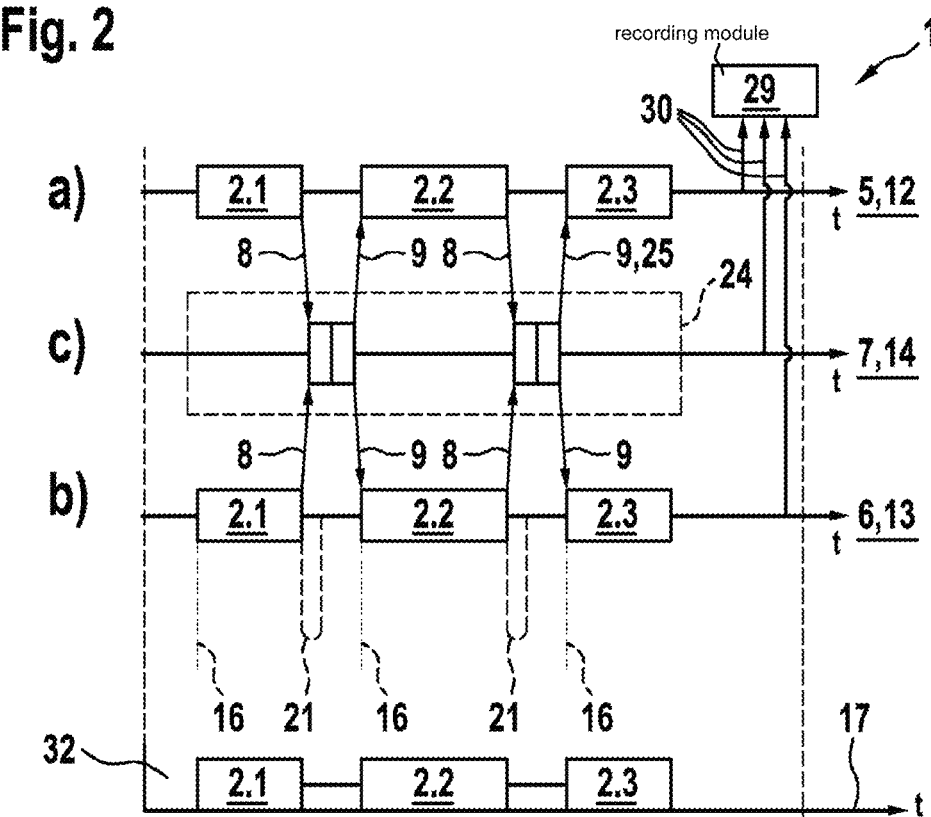
FIG. 1 shows a described data processing network, according to an example embodiment of the present invention.
FIG. 2 shows processing of the individual data processing steps on a logical timeline, according to an example embodiment of the present invention.

FIG. 1 shows a described data processing network 1 in a motor vehicle 23. By way of example, it is shown here that the data processing network 1 is used to process data from sensors 19 and an output data receiver 20 is supplied with data by the system. Such an output data receiver 20 can, for example, be a system for an autonomous driving operation or a similar system. The data processing network 1 is used, for example, to reduce the sensor data to decision-relevant parameters, which can be output data 4 of the data processing network 1.

The data processing network 1 here also includes hardware components on which the data processing network 1, or its components and modules, can be operated.

The data processing network 1 performs individual data processing steps 2 that build on one another. Output data 4 of one data processing step 2 can be input data 3 of a further data processing step 2. Each data processing step 2 is realized here with a plurality of data processing modules 5, 6 that are executed as independently as possible of one another. A first data processing module 5 and a second data processing module 6 are shown here in each case. More than two data processing modules can also be provided, which perform a data processing step 2 (in parallel).

The data processing network 1 comprises further components, which are explained in detail below with reference to the other figures. In particular, this includes the comparator module 7 and possibly also a synchronizer 27, which are only indicated schematically here.

FIG. 1 also shows a recording module 29 which is connected to each of the data processing modules 5, 6 and receives and records debug data 30 of each of the individual data processing steps. The recording module 29 in particular receives, as debug data 30, state data of the data processing module 30 and input data 3, and in particular also control parameters relating to the execution of the individual data processing steps 2.

FIG. 2 shows a different representation of the described data processing network 1. FIG. 2 shows three arrows one below the other, which define the individual hardware components and at the same time also depict the individual method steps a), b) and c) of the described method. The arrows also provide a representation of the processes on the respective hardware components on a logical timeline 17. The upper arrow is a first hardware component 12 on which first data processing modules 5 are implemented. The lower arrow is a second hardware component 13 on which second data processing modules 6 are implemented. The middle arrow is a third hardware component 14 on which the comparator module 7 is realized. Data processing steps 2 of the data processing network 1 are executed in first data processing modules 5 and second data processing modules 6 in each case. Whenever a data processing step 2 is completed, a control parameter 8 is transmitted to the comparator module 7, which then recognizes, by comparing the control parameters 8, whether the data processing step 2 has been executed correctly (i.e., without errors). The comparator module 7 then generates synchronized control parameters 9 which are used to trigger further data processing steps 2, which then further process output data (not shown here) from previous data processing steps 2. The comparator module 8 and the associated components can also be understood as a central unit 24 of the described data processing network 1. The synchronized control parameters 9 can be understood as stimuli 25 for triggering further data processing steps 2.

Also shown schematically in FIG. 2 is the recording module 29, which records debug data 30 that it receives from the first data processing module 5, the second data processing module 6, and the comparator module 7.

Figure 3:
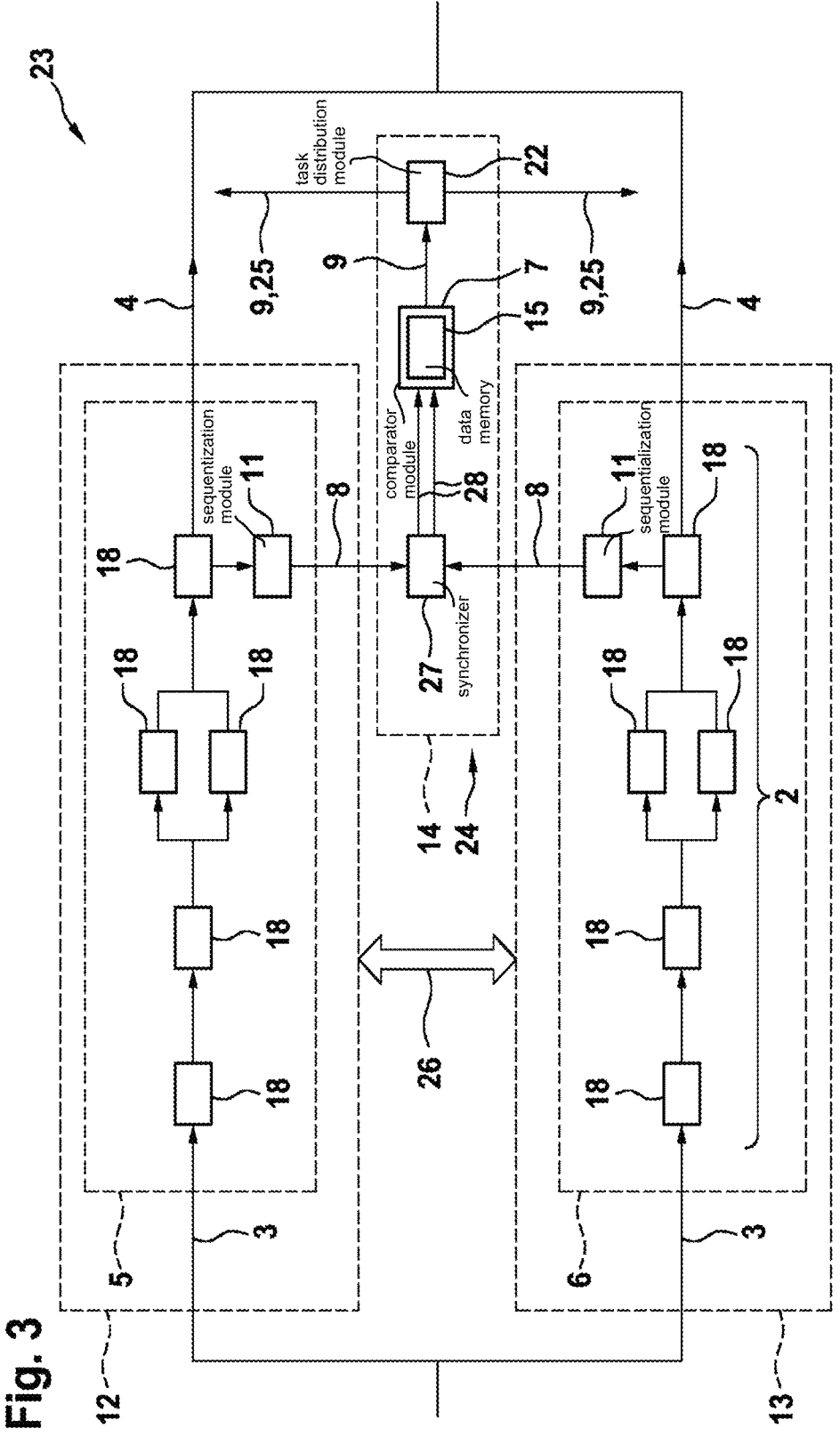
FIG. 3 shows the processing of a single data processing step with the various data processing modules, according to an example embodiment of the present invention.

FIG. 3 shows the parallel processing of a data processing step 2 by a first data processing module 5 and by a second data processing module 6 in even greater detail. It can be seen that the first data processing module 5 is realized on a first hardware component 12, while the second data processing module 6 is realized on a second hardware component 13. The first data processing module 5 and the second data processing module 6 each process the same input data 3 and should also each generate the same output data 4.

A data processing step 2 or a data processing module 5, 6 can be further subdivided into a multiplicity of individual data processing components 18, each of which relates to substeps of the data processing. The data processing step 2, or the data processing module 5, 6 as defined here, therefore already relates to pre-groupings, which are sensibly selected or defined depending on the application, of substeps which are executed with the data processing components 18. The pre-grouping of substeps is preferably selected such that no data storage is required within a data processing step 2 or a data processing module 5, 6 and that, in particular, no data other than the input data are accessed for the execution.

The first data processing module 5 and the second data processing module 6 respectively generate control parameters 8 which are evaluated by the comparator module 7. The comparator module 7 is realized on a third hardware component 14, which is independent of the first hardware component 12 and the second hardware component 13, forms a central unit 24 and preferably offers the above-described higher safety (higher ASIL level) of the execution. In preferred design variants, a sequentialization module 11 for obtaining the control parameters 8 from the data processing is in each case upstream of each data processing module 5, 6 and a synchronizer 27 is upstream of the comparator module 7. Additionally, a task distribution module 22, which outputs synchronized control parameters 9 or stimuli 25 for triggering further data processing steps 2, can be downstream of the comparator module 7. The synchronizer 27, comparator module 7, and task distribution module 22 can be realized together as the described central unit 24 on the third hardware component 14. Preferably, the described data processing network 1 is operated such that data processing steps 2 are executed on the available and not fully utilized hardware. The task distribution module 22 can initiate this distribution of the data processing steps 2 to the available hardware. In addition, the execution of the data processing steps 2 performed takes a different amount of time on each hardware. The synchronizer 27 sorts the incoming control parameters 8 so that, even if the hardware is under high load, the comparator module 7 compares the correct control parameters 8 with one another in order to generate correct synchronized control parameters 9. For this purpose, the control parameters 8 are transferred as control parameter tuples 28 from the synchronizer 27 to the comparator module 7. It is not necessary for input data 3 and output data 4 respectively to be transferred via the central unit 24 or the comparator module 7 from one data processing step 2 to the next data processing step 2. For this purpose, additional data transmission interfaces 26 may also exist between the data processing modules 5, 6 or the respective hardware components 12, 13, which interfaces exist independently of the comparator module 7. Data provided via these data transmission interfaces 26 are preferably accessed if it is determined with the comparator module 7 that the particular data processing step 2, generating the output data 4, has been processed without errors in both data processing modules 5, 6.

Figure 4:
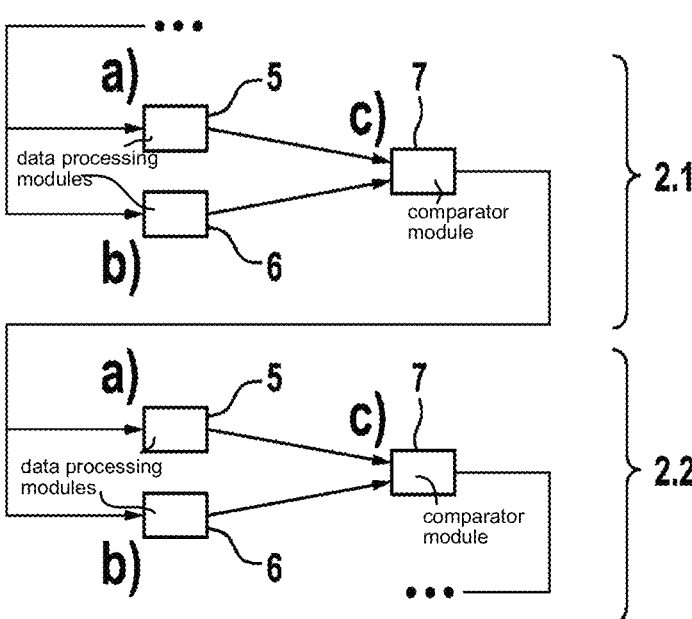
FIG. 4 is a flowchart of the described method performed with the data processing network, according to an example embodiment of the present invention.

FIG. 4 shows yet another representation of the described method, in which method steps a), b) and c) are respectively performed for each data processing step 2. The actual data processing steps 2 are always executed redundantly with the first data processing module 5 and with the second data processing module 6. In each case, the comparator module 7 subsequently checks whether the data processing step 2 has been executed correctly before the next data processing step 2 is started.

Figure 5:
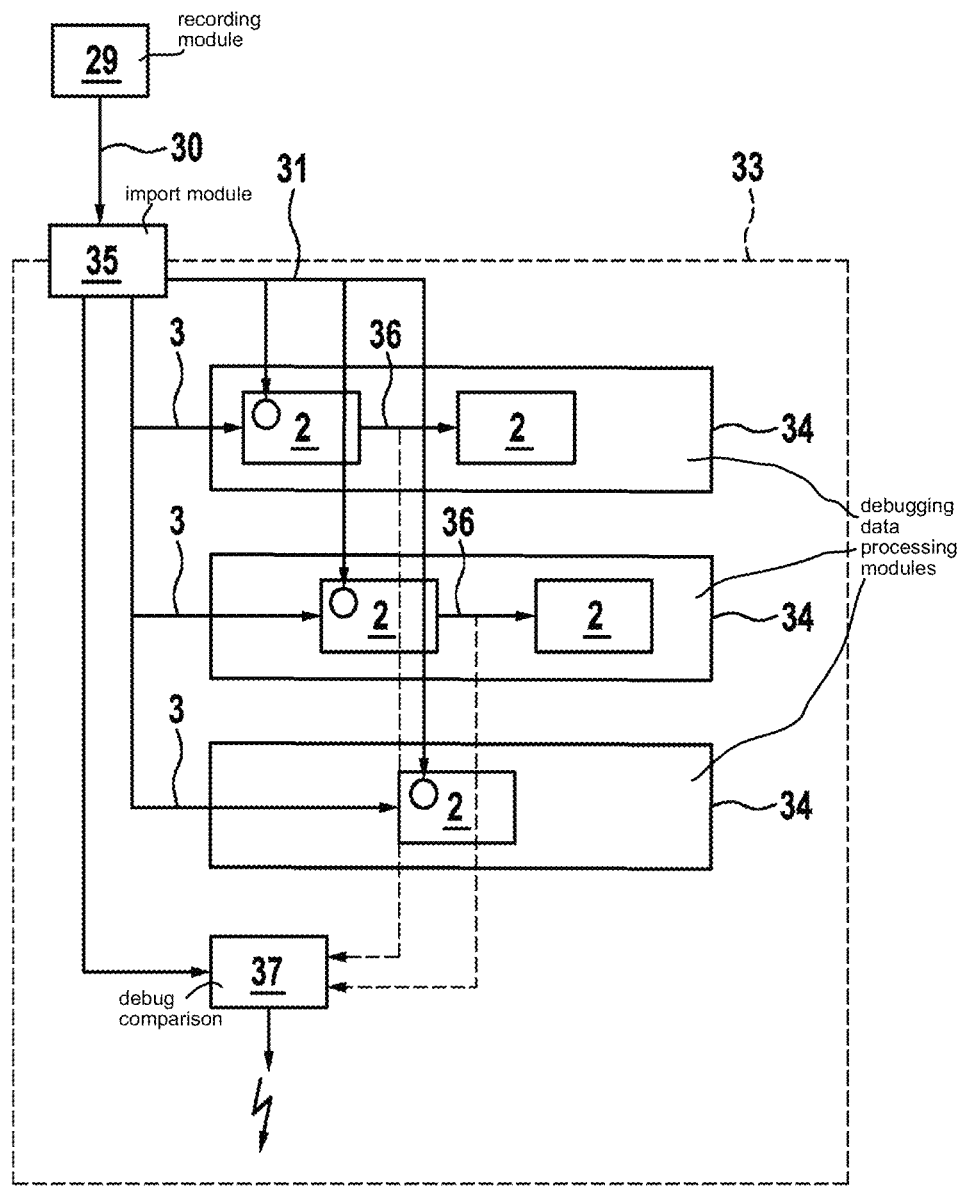
FIG. 5 shows a described debugging system, according to an example embodiment of the present invention.

FIG. 5 shows the debugging system 33. The recording module 29 is also shown here (although it does not belong to the debugging system 33 but to the data processing network 1). Debug data 30 are imported into the debugging system 33 via the import module 35. Debugging data processing modules 34 are provided in the debugging system. The debugging data processing modules 34 are configured to execute the same data processing steps 2 that have also been executed in the data processing network. For this purpose, the import module 35 feeds the states 31 and the input data 3 into each debugging data processing module 34 for the data processing steps 2. Performing the data processing steps 2 with the debugging system produces synthetic input data 36 of further data processing steps 2, which can then also be supplied for evaluation with the debug comparison 37.

The invention claimed is:

1. A data processing system comprising:

a first data processing module, wherein the first data processing module is configured to:

perform a sequence of data processing steps that each transforms respective input data to output data; and generate, for each of the sequence of steps the first data processing module performs, a respective first control parameter indicative of the performance of that respective step;

a second data processing module, wherein the second data processing module is configured to:

perform an identical sequence of data processing steps as the first data processing module using identical input data as the input data used by the first data processing module; and generate, for each of the sequence of steps the second data processing module performs, a respective second control parameter indicative of the performance of that respective step;

a synchronizer, wherein the synchronizer is configured to:

receive the first control parameters and the second control parameters;

compare the first control parameters with the second control parameters to determine which of (a) the received first control parameters and (b) the received second control parameters are associated with corresponding ones of the steps performed, respectively, by the first and second data processing modules; and based on results of the comparison, form tuples that each contains, and associates with each other, a respective subset of data from the first control parameters and a respective subset of data from the second control parameters; and a recording module, wherein the recording module is configured to receive the tuples formed by the synchronizer and, when a debug mode of the data processing system is activate, store the tuples as debug data indicative of a data processing performance, by the first and second data processing modules, during their respective executions of individual steps of the sequence of steps.

2. The data processing system according to claim 1, wherein the recording module is configured to, when the debug mode is active, record a state of the first data processing module and/or the second data processing module.

3. The data processing system according to claim 1, wherein the recording module is configured to, when the debug mode is active, record initial input data for each of the data processing steps performed by the first and/or second data processing modules.

4. The data processing system according to claim 1, wherein priority parameters are assigned to the data processing steps, and the recording module is configured to record information on the execution of the data processing steps according to the assigned priority parameters.

5. The data processing system according to claim 1, wherein, when the debug mode is active, the data processing system is configured to enter a slowdown mode that slows execution of the data processing steps to a rate at which the recording module can capture the debug data for each of the data processing steps is.

6. The data processing network system according to claim 1, wherein the first data processing module is implemented using a first hardware component and the second data processing module is implemented using a second hardware component, and the first hardware component and the second hardware component are physically separated from each other.

7. The data processing system according to claim 6, wherein the first data processing module is not ASIL-D-compliant.

8. The data processing system according to claim 6, wherein the synchronizer is implemented using a third hardware component that is physically separated from the first hardware component and the second hardware component.

9. The data processing system according to claim 8, wherein the first data processing module is not ASIL-D-compliant and the third hardware component is ASIL-D-compliant.

10. The data processing system according to claim 1, wherein:

the synchronizer includes a data memory configured to store the first and second control parameters with associated time information, thereby creating a logical timeline that represents an execution order of the sequence of steps as performed by the first and second data processing modules; and the recording module is configured to, when the debug mode is active, record the logical timeline with a flowchart of the performed data processing steps.

11. A debugging system for analyzing a data processing performance of a data processing system, wherein the data processing system includes (I) a first data processing module, wherein the first data processing module is configured to: (i) perform a sequence of data processing steps that each transforms respective input data to output data; and (ii) generate, for each of the sequence of steps the first data processing module performs, a respective first control parameter indicative of the performance of that respective step; (II) a second data processing module, wherein the second data processing module is configured to: (i) perform an identical sequence of data processing steps as the first data processing module using identical input data as the input data used by the first data processing module; and (ii) generate, for each of the sequence of steps the second data processing module performs, a respective second control parameter indicative of the performance of that respective step; (III) a synchronizer, wherein the synchronizer is configured to: (i) receive the first control parameters and the second control parameters; (ii) compare the first control parameters with the second control parameters to determine which of (a) the received first control parameters and (b) the received second control parameters are associated with corresponding ones of the steps performed, respectively, by the first and second data processing modules; and (iii) based on results of the comparison, form tuples that each contains, and associates with each other, a respective subset of data from the first control parameters and a respective subset of data from the second control parameters; and (IV) a recording module, wherein the recording module is configured to (i) receive the tuples formed by the synchronizer and (ii) when a debug mode of the data processing system is activate, store the tuples as debug data indicative of a data processing performance, by the first and second data processing modules, during their respective executions of individual steps of the sequence of steps, the debugging system comprising:

debugging data processing modules configured to repli-
cate the sequence of data processing steps performed
by the first and second data processing modules of the
data processing system;

an import module configured to import the debug data
stored by the recording module of the data processing
system; and a processor arrangement that includes at least one pro-
cessor, wherein the processor arrangement is config-
ured to initiate the replicated data processing based on
with the imported debug data.

12. The debugging system according to claim 11, wherein,
during the replicated data processing performed by the
debugging data processing modules, a debug comparison is
performed between (i) synthetic input data generated by the
debugging system and input data that was recorded by the
recording module while the debug mode was active.

13. The debugging system according to claim 11,
wherein:

the debugging data processing modules include a first
debugging data processing module and a second debug-
ging data processing module, which are respectively
configured to replicate the sequence of data processing
steps performed by the first data processing module and
the second data processing module of the data process-
ing system; and when the replicated data processing is initiated by the
processor arrangement, the import module is further
configured to import, into the first and second debug-
ging data processing modules, (i) initial input data for
at least one of the sequence of data processing steps and
(ii) a state of at least one of the first data processing
module and the second data processing module.

* * * * *